United States Patent Office 3,753,967
Patented Aug. 21, 1973

3,753,967
PROCESS OF PREPARING POLYMERS OF CONJUGATED DIENES
Renier J. L. Graff, Beek, and Adrianus G. Marchal, Stein, Netherlands, assignors to Stamicarbon N.V., Heerlen, Netherlands
No Drawing. Filed Feb. 24, 1971, Ser. No. 118,564
Claims priority, application Netherlands, Feb. 27, 1970, 7002794
Int. Cl. C08d *3/04, 3/06*
U.S. Cl. 260—94.3     7 Claims

ABSTRACT OF THE DISCLOSURE

An improved process for polymerizing conjugated dienes in the presence of a catalyst comprising adding a metal containing Lewis acid to the reaction mixture to control the molecular weight of the polymer being produced.

---

The present invention relates to a process for preparing polymers of conjugated dienes in the presence of a catalyst and a compound which controls the molecular weight of the polymers produced. The catalyst used is produced by adding together a nickel carbonyl compound and a titanium halide and removing all or part of the carbon monoxide formed therefrom. In U.S. Pat. No. 3,476,733 a process is described for preparing polymers of conjugated dienes with such a catalyst system. This patent teaches that the polymerization can be carried out in the presence of hydrogen for controlling the molecular weight.

However, in commercial practice, it has been found impossible to control the molecular weight over a sufficiently wide range. It has now been found possible to control the molecular weight over a sufficiently wide range by performing the polymerization in the presence of a metal-containing, no metal-carbon bond-containing, soluble Lewis acid other than titanium halide. It has further been found that in many cases these compounds also raise the activity of the catalyst system.

The improved process of the present invention for preparing polymers of conjugated dienes comprises polymerizing the dienes in the presence of a catalyst prepared by adding together a nickel carbonyl compound and a titanium halide and removing all or part of the carbon monoxide formed thereby and in the presence of which controls the molecular weight of the polymers formed, said molecular weight controlling compound being a metal-containing, no metal-carbon bond-containing, soluble Lewis acid other than titanium halide.

Lewis acids which can be employed according to the invention are those metal containing Lewis acids which are soluble in the polymerization medium. A survey of Lewis acids is given in Interscience, 1963, vol. I, on p. 191 and pp. 284–292. Examples of metal-containing Lewis acids which can be used in the present process include those compounds containing a metal selected from the group consisting of aluminium, gold, bismuth, niobium, cadmium, cobalt, chromium, copper, iron, gallium, germanium, mercury, vanadium, magnesium, manganese, molybdenum, nickel, platinum, lead, tin or uranium. Preferably, the Lewis acid is an aluminium-containing Lewis acid, such as aluminium oleates and in particular, aluminium mono-oleate. Some of Lewis acids are insoluble or insufficiently soluble in the polymerization medium; however, these Lewis acids can usually be modified, for instance by a reaction with a complex or an organic compound containing alkyl, cycloalkyl, aryl, alkoxy, acyl, or acyloxy groups, to increase the solubility of the modified compounds so that they can be used in the present process.

A preferred group of metal-containing Lewis acids have the general formula $MR_mX_n$, in which M represents a metal atom selected from the group listed hereinbefore, R represents an alkoxy, or an acyloxy group, having up to 26 carbon atoms, X represents an inorganic acid residue or a hydroxyl group, $m$ and $n$ are integers, $m$ being not equal to zero, wherein the sum of $n$ and $m$ is equal to the valence of the metal M. Especially suitable organic R groups are residues of saturated or unsaturated mono-carboxylic or dicarboxylic acids, oleic acid being preferred in particular. Stearates, too, can be used with excellent results. The inorganic acid residue X may be, for instance, a halogen, a sulphate or a nitrate group, as well as other inorganic acid residues.

The conjugated dienes which can be polymerized according to the present invention are, preferably, the dienes having from 4 up to, and including, 12 carbon atoms, e.g., butadiene, isoprene, 2,3-dimethyl butadiene 1-3, pentadiene 1-3, 2-methyl pentadiene 1-3, 4-methyl pentadiene 1-3, hexadiene 1-3, hexadiene 2-4, octadiene 2-4, decadiene 1-3, decadiene 3-5, undecadiene 1-3, cyclopentadiene 1-3, cyclohexadiene 1-3, cyclo-octadiene 1-3, such compounds as heptatriene 1,3,6 octatriene 1,3,7, cyclo-octatriene 1,3,6, cyclo-octatriene 1,3,7, and, if desired, halogen-containing dienes, e.g., chloroprene. Mixtures of these conjugated dienes, mixed, if so desired, in a saturated or unsaturated hydrocarbon medium can also be used.

Suitable nickel carbonyl compounds include nickel carbonyl phosphorus trifluoride, nickel carbonyl triphenyl phosphine, dinickel octacarbonyl, tetranickel dodecacarbonyl, nickel carbonyl hydrogen, nitrosyl nickel carbonyl $(Ni(CO)_3NO)$, diphenyl acetylene dinickel hexacarbonyl. Also mixtures of these carbonyl compounds can be used. A preferable nickel carbonyl compound is nickel tetracarbonyl.

Titanium halides useful in the invention are those in which the titanium is bound only to halogen atoms, for instance, titanium tetrachloride, titanium tetraiodide, titanium trichloride, and titanium tribromide, as well as titanium halide compounds in which one or more halogen atoms has been replaced by a hydrogen atom, a hydroxy or an alkoxy group of from 1–12 carbon atoms. Examples of such titanium compounds include titanium alkoxychloride and titanium hydroxyiodide. Titanium tetrachloride is a preferable titanium halide for use in the present process. Mixtures of the above titanium halide compounds, for instance a mixture of titanium tetrachloride and titanium trichloride can also be used.

The ratio between the catalyst components can be varied within wide limits. In general, a molar ratio between the carbonyl compound and the halide of between 35:1 and 1:35 are preferably used. Higher or lower ratios can also be used, but there is no particular advantage in using the higher or lower ratios. Usually, a nearly equimolar ratio of the catalyst components, e.g., between 4:1 and 1:4, is preferable because it results in a minimal catalyst cost without impairing the stereospecificity of the catalyst.

The concentration of the catalyst can also be varied within wide limits. By "concentration of the catalyst" is here understood to mean the sum of the concentrations of the metal-containing catalyst components. In general, the concentration is between 100 and 0.002 milli-mole per liter of reaction medium. Preferably, concentrations between 10 and 0.1 millimole per liter of polymerization medium are used. Concentrations below 0.1 millimole per liter can be used, as mentioned above, but care should be taken that the contaminants in the starting materials be at a comparatively reduced concentration so as to not inactivate the catalyst.

The formaion of carbon monoxide resulting from mixing the nickel carbonyl and titanium halide may take place in the presence of the conjugated dienes to be polymerized.

It is also possible to mix the nickel carbonyl and titanium compounds in the presence of an aliphatic or cycloaliphatic compound containing at least one double carbon-carbon bond with formation of carbon monoxide prior to adding the conjugated dienes. It is not necessary to remove all of the carbon monoxide formed prior to the polymerization reaction; however, the more of the carbon monoxide removed, the more active the catalyst system is.

Neither is it necessary to remove the theoretical amount of carbon monoxide which could be produced from the nickel carbonyl compound which is mixed with the titanium compounds. For instance, if one of the catalyst components is nickel tetracarbonyl, it is quite possible to remove only one, two or three equivalents of carbon monoxide.

The removal of the carbon monoxide formed can be effected by blowing a stream of an inert gas or inert vapour, e.g., nitrogen, hydrogen or hydrocarbons, such as methane continuously or discontinuously through the solution.

If carbon monoxide is formed in the presence of the conjugated dienes to be polymerized, it is possible to evaporate part of these dienes, and to remove the carbon monoxide from the vapor and return the condensed diene to the process. The carbon monoxide formed may also be removed by adsorption by a surface-active adsorbent, or by chemical adsorption agents.

By adding an activator to the catalyst or to one or more of the catalyst components, the activity of the catalyst can be enhanced. The activator added is a compound containing a free electron pair, e.g., a compound of an element from the fifth or sixth principal group of the Periodic System, in particular, nitrogen, phosphorus, oxygen and sulphur. Preferred compounds which can be added as an activator are compounds of ammonia and amines, such as trimethyl amine, triethyl amine, or amines carrying various alkyl, cycloalkyl or aryl groups on the nitrogen atom, whether or not by the side of hydrogen, for instance, N-phenyl-$\beta$-naphthyl amine. Other preferred activators are nitrogen oxides such as nitrogen monoxide, nitriles, such as acrylonitrile and carboxylic acids, such as formic acid, acetic acid and stearic acid. Further alcohols, such as methanol and butanol, ethers, such as diethyl ether and dibutyl ether and aldehydes, such as acrolein, can be used as the activator. Preferably, the activator is water or an oxygenous gas, as these materials are very cheap and easy to use in measured quantities. The amount of activator added depends on the catalyst system used and on the nature of the activator. In general, an amount between 10 and 300 moles percent with respect to the amount of catalyst is sufficient.

The polymerization is carried out at temperatures between —50° and +150° C., and is preferably performed at temperatures between —20° and +70° C. Preferably, temperatures around room temperature or slightly higher or lower than room temperature are employed to conserve on heating and cooling requirements.

The pressure during the polymerization is not critical. The process can be carried out at about atmospheric pressure, or at higher pressures, e.g., 1, 2, 4, 10, 20 atm. or even higher pressures.

The molecular weight of the polymers prepared can be measured according to Mooney (ASTM D 927) and is in general dependent on the ratio of the catalyst components, on the purity of the conjugated diene and on the activator added. A higher ratio between the carbonyl compound and the halide in general leads to a lower Mooney viscosity.

The amount of the Lewis acids applied according to the invention can vary within wide limits. In general, an amount between 100 and 0.001 millimole per liter is chosen, and preferably, amounts between 50 and 0.005, and further, between 10 and 0.01 are used.

The polymerization can be carried out in a diluting agent which is inert, i.e., does not contain components in sufficient amount to effect the catalyst as to partially or completely destroy its catalytic activity. For instance, during the polymerization, small amounts of an alcohol may be present to act as activator for the catalyst. However, if larger amounts are used, the catalyst is inactivated. Larger amounts of the alcohol are used in stopping the polymerization. In general, the diluting agent may be a liquid or liquefied saturated aliphatic or cycloaliphatic hydrocarbon, e.g., ethane, propane, butane, pentane, hexane, heptane, or other petroleum fractions, cyclohexane, isopropyl cyclohexane, aromatic hydrocarbons, such as benzene, toluene and xylene, or halogenated aliphatic, cycloaliphatic or aromatic hydrocarbons, e.g., tetrachloroethylene, methyl chloride and chlorobenzene. Also mixtures of these compounds can be used. Preferably, toluene, benzene, heptane or a gasoline fraction largely consisting of heptane is used as diluting agents. In addition to, or in place of the above-mentioned diluting agents, one or more of the conjugated dienes to be polymerized, or other unsaturated hydrocarbons in the liquid state can be used as diluting agents. When polymerizing butadiene, the butadiene preferably is also used as a diluting agent.

The usual chemicals which are normally added to polymerized dienes can be added to the present process. Particularly, when forming polybutadiene, such chemicals as zinc oxide, stearic acid, anti-oxidants, UV stabilizers, organic accelerators, e.g., tetramethyl thiuramdisulphide, 2-mercaptobenzthiazole, so-called tackifiers, dyes and pigments can be added. If desired, at least some of these additives, e.g., one or more anti-oxidants, may be present during the polymerization. The chemicals may be added as such, but preferably they are dispersed in the diluting agent used or in the conjugated dienes being polymerized. Such fillers as chalk and kaolin, reinforcing fillers, e.g. "HAF," "ISAF," "FEF" and "SRF" (so-called furnace blacks), and so-called extender oils can also be added during the polymerization.

The rubber-like polymers obtained in the process according to the invention can be cured simply by heating them with sulphur to a temperature of 100 to 250° C. and preferably to about 140° to about 170° C. A particularly preferred polymer which can be produced by the present invention can be cured simply by heating in the presence of sulphur is polybutadiene having a cis content of more than 80% and preferably about 90%. Also, sources of free radicals, such as peroxides, can be added to cure the polymers. The polymers produced by the process of the present invention can be mixed, to advantage, with other rubber materials such as natural rubber or styrene-butadiene rubber, and then cured, which yields a product with excellent properties. This product can be made, in particular, into motor vehicle tires. The rubber-like polymers produced by the process of the present invention can also be used in the manufacture of bicycle tires, conveyor belts, footwear and floor-covering materials. The polymers obtained according to the present invention can be processed into the shape of a crumb, sheet, strand or a bale.

The invention will be more readily understood by reference to the following examples; however, these examples are intended to illustrate the invention and not to be construed to limit the scope of the invention. Cis content is here understood to mean the number of bonds a cis structure has per one hundred double carbon-carbon bonds of the structure.

The Mooney viscosity is measured according to ASTM D 927.

EXAMPLE 1

A flask, which was provided with a stirrer, a thermometer, a gas supply tube and a gas discharge tube, was charged 1,000 ml. of cyclohexane and 225 g. of butadiene mainly dissolved in the cyclohexane. Then 0.5 millimole of nickel tetracarbonyl, 1.25 millimoles of titanium tetrachloride and 0.5 millimole of aluminium dichloro-oleate were added, with exclusion of moisture and air, whereupon dry nitrogen was passed through the contents of the flask at a rate of 6 liters per hour. After about 20 minutes, the temperature of the polymerization medium started to rise to approximately 50° C. as a result of the polymerization heat evolved. The polymerization was continued for 60 or more minutes, during which time the nitrogen passed over a carbon monoxide content of 0.15% by volume. After this 60 minute period, the polymerization medium had a rather high viscosity and the polymerization was discontinued by the addition of 10 ml. of methanol to the reaction mixture. The catalyst residues were removed by stirring the polymerization medium with 200 ml. of distilled water. After the layer of water had been separated off, the polymer was stabilized using a customary anti-oxidant. The polymer was then coagulated by pouring the polymer solution into 600 ml. of a mixture of equal volumetric parts of methanol and acetone. Next, the polymer was dried in vacuum at room temperature and subsequently homogenized on a roll. After being stabilized once again, 22 g. of polymer were obtained which was practically free from gel. The polymer had a cis content of 96% and a Mooney viscosity of 15. In a similar experiment, benzene was added to the polymerization reaction mixture in the flask as diluting agent. A polymer with the same properties as above was obtained.

For comparison, Example 1 was repeated without addition of aluminium oleate. With a polymerization period of 50 minutes, 50 g. of polymer were obtained having a Mooney viscosity of 77. Example 1 was again repeated for the purpose of comparison, but now with addition of 0.5 millimole of oleic acid instead of an aluminium oleate. After polymerization for 120 minutes, 32 g. of polymer with a Mooney viscosity of 70 were obtained. Thus it can be seen that this quantity of oleic acid did not significantly decrease the Mooney value.

EXAMPLE 2

The procedure of Example 1 was repeated with the exception that 0.2 millimole of the aluminium dichloro-oleate was added. A polymer was formed, in a yield of 23 g., having the same cis content as the polymer of Example 1 but with a Mooney viscosity of 28.

EXAMPLE 3

Again, the procedure of Example 1 was repeated with the exception that 0.1 millimole of the aluminium dichloro-oleate was added. A polymer was formed, in a yield of 28 g., having the same cis solvent as the polymer of Example 1 but with a Mooney viscosity of 30.

EXAMPLES 4–6

In examples similar to Example 1, but with the exception that aluminium chlorodioleate was used in place of the aluminium dichloro-oleate, the following results were obtained:

| Example | Quantity of Aluminium chlorodioleate (millimoles) | Duration (min.) | Polymer yield (g.) | Mooney viscosity |
|---|---|---|---|---|
| 4 | 0.25 | 145 | 57 | 3 |
| 5 | 0.1 | 75 | 77 | 4 |
| 6 | 0.1 | 30 | 51 | 5 |

The aluminium chlorodioleate used in Examples 4 and 5 was obtained by reaction of an aluminium alkyl with oleic acid. The aluminium chlorodioleate used in Example 6 was prepared from aluminium trichloride and oleic acid.

EXAMPLE 7

Example 5 was repeated with the exception that aluminium trioleate was used in place of the aluminium chlorodioleate. With a polymerization time of 90 minutes, 41 g. of polymer were obtained which had a Mooney viscosity of 43.

EXAMPLE 8

Example 1 was repeated, with the exception that iron dichloromonostearate was used as the molecular weight regulator. Comparable results to those of Example 1 were obtained.

EXAMPLE 9

Example 8 was repeated, with the exception that chloromagnesiumstearate was used as the molecular weight regulator. The same results as obtained in Example 8 were obtained.

COMPARATIVE EXAMPLE 1

On repetition of Example 1, with the exception that carbon monoxide was not removed from the flask. The polymerization had not yet started after two hours. Subsequently, nitrogen was flushed through the flask to remove carbon monoxide whereupon the color of the diluting agent changed from light yellow to brownish grey and polymerization was initiated.

What is claimed is:

1. In a process for producing polymers by polymerizing conjugated dienes in the presence of a catalyst, said catalyst being prepared by adding together a nickel carbonyl compound and a titanium halide selected from the group consisting of titanium halides having titanium bound only to halogen atoms and derivatives thereof wherein one or more halogen atoms have been replaced by a hydrogen atom, a hydroxy group or an alkoxy group of 1–12 carbon atoms, and removing at least a portion of the carbon monoxide formed from the reaction of the nickel carbonyl and the titanium halide, the improvement comprising adding a metal containing, no metal-carbon bond-containing, soluble Lewis acid other than said titanium halide, said Lewis acid having the formula $$MR_mX_n$$

wherein M is a metal selected from the group consisting of aluminium, gold, bismuth, niobium, cadmium, cobalt, chromium, copper, iron, gallium, germanium, mercury, vanadium, magnesium, manganese, molybdenum, nickel, platinum, lead, tin and uranium, R is an alkoxy or an acyloxy group with up to 26 carbon atoms, X is an inorganic acid residue or a hydroxy group, $n$ is an integer and $m$ is an integer excluding O, wherein the sum of $n$ and $m$ is equal to the valence of the metal M, to the reaction mixture to control the molecular weight of the polymer being produced.

2. A process according to claim 1 wherein M is aluminium.

3. A process according to claim 1 wherein R is the residue of a mono- or dicarboxylic acid.

4. A process according to claim 3 wherein R is the residue of oleic acid.

5. A process according to claim 1 wherein butadiene is the conjugated diene being polymerized.

6. A process according to claim 1 wherein nickel tetracarbonyl is the nickel carbonyl compound.

7. A process according to claim 1 wherein the titanium halide is selected from the group consisting of titanium tetrachloride, and a mixture of titanium tetrachloride and titanium trichloride.

References Cited
UNITED STATES PATENTS

| | | | |
|---|---|---|---|
| 3,476,733 | 11/1969 | Van den Berg | 260—94.3 |
| 3,585,178 | 6/1971 | Kasai et al. | 260—94.3 |
| 3,242,156 | 3/1966 | Marconi et al. | 260—94.3 |
| 3,649,605 | 3/1972 | Throckmorton | 260—82.1 |

JOSEPH L. SCHOFER, Primary Examiner

W. R. HAMROCK, Assistant Examiner

U.S. Cl. X.R.

260—82.1, 92.3, 94.7 R